Jan. 5, 1965

L. O. STEBBINS ETAL 3,164,007

MEANS AND TECHNIQUES FOR PRODUCING INDICATIONS
OF FLAWS IN METAL INSPECTION

Filed April 3, 1961

LARRY O. STEBBINS
TAKEO. C. SATO
INVENTORS

BY

Lyon & Lyon
ATTORNEYS

United States Patent Office 3,164,007
Patented Jan. 5, 1965

3,164,007
MEANS AND TECHNIQUES FOR PRODUCING INDICATIONS OF FLAWS IN METAL INSPECTION
Larry O. Stebbins, Temple City, and Takeo C. Sato, Los Angeles, Calif., assignors, by mesne assignments, to Automation Industries, Inc., El Segundo, Calif., a corporation of California
Filed Apr. 3, 1961, Ser. No. 100,217
4 Claims. (Cl. 73—67.9)

The present invention relates to improved means and techniques for producing indications of flaws in metals and is directed to, but not limited to, detection of such flaws in metal pipe in which it is desired to produce not only indications and/or records of inhomogeneities in the metal but also of changes in wall thickness of the pipe when such thickness is below a certain standard.

In general, the system disclosed herein is an improved metal inspection system in which a series of time spaced energy pulses are periodically transferred to a metal test piece and the resulting echo signals are observed, indicated or recorded.

In accordance with an important feature of the present invention gating circuits are incorporated in the system for producing one or more gating voltages that allow indications and/or recordings to be produced of certain portions of the metal. Thus, in one form of the present invention, two gating voltages are provided which overlap in time, the first gating voltage producing indications only when a flaw occurs close to the front surface of the metal, the second gate producing an indication when the flaw occurs in a region relatively close to the back surface of the metal and also a third indication is produced when a flaw occurs in that region corresponding to the time of overlap of the two gates. In the above-indicated arrangement should the wall thickness of the metal be less than a certain standard, the echo reflected from the back surface appears within the time interval of the second-mentioned gate and the resulting echo produced by such reflection is also indicated as a flaw. In the second form of the invention described herein only one gating voltage is used with the leading edge thereof being initiated substantially contemporaneously with or shortly after the reflection from the front surface and with the trailing edge of the gating voltage terminating at a time corresponding to a certain thickness of the material such that indications and/or recordings are produced not only in response to inhomogeneities in the material between the front and back surfaces thereof but also when the wall thickness is less than a certain thickness.

It is therefore an object of the present invention to provide means and techniques whereby the above-indicated results are accomplished.

Another object of the present invention is to provide an improved system of this character in which the indications and/or recordings of either inhomogeneities or minimum wall thickness are accentuated and distinguished.

Another object of the present invention is to provide a system of this character which is particularly suitable for inspection of pipe used in conveying fluids in the oil industry.

Another object of the present invention is to provide a system of this character which is particularly useful in combination with apparatus described in the copending application of Larry O. Stebbins, Serial No. 100,215 filed April 3, 1961 in which means and techniques are described for producing a recording of variations in wall thickness, the indications produced by the present system being useful in interpretation of recordings made in accordance with the teachings of the above-mentioned copending application.

Another object of the present invention is to provide an improved system of this character whereby recordings are produced which allow one to distinguish between indications produced by inhomogeneities on the one hand and those produced as a result of the wall thickness of the metal falling below a certain standard.

Another object of the present invention is to provide a system of this character which is particularly suitable wherein there is relative movement between the metal pipe and the transducer which transmits energy into the metal piece and receives resulting echo signals from the metal piece through a water column.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates one form of the invention which is practiced when the switch 9 is in its closed position and the system is adjusted as illustrated in FIGURE 3 to produce two overlapping gates. FIGURE 1 also illustrates a second form of the invention which is practiced when the switch 9 is in its open condition and the system is adjusted to produce a single gate as indicated in FIGURE 4.

FIGURE 2 illustrates generally the time relationship between various pulses in either of the two systems indicated above.

FIGURE 3 illustrates the time occurrence of various pulses and gates when the system shown in FIGURE 1 is operated with the switch 9 closed.

FIGURE 4 illustrates the time relationship between various pulses and the single gate when the system is adjusted and operates with the switch 9 in its open position.

FIGURE 5 illustrates a recording made in accordance with the present invention in conjunction with another correlated recording of thickness.

Referring to the drawings, FIGURE 1 shows a metal inspection system for detecting the presence of flaws and their location in a metal test piece 10 which has recurrent pulses of energy supplied thereto through a water stream or column 11 from a crystal transducer 12 operating at a frequency of, for example, 10 megacycles, the crystal 12 being recurrently excited by conventional pulse-generating means 13 to periodically supply 10-megacycle energy to the test piece 10 which is considered to be a section of a metal pipe. The same crystal transducer 12 is excited by the resulting returning echoes from the front and back faces of the test piece as well as inhomogeneities therein to develop corresponding voltages which are amplified in receiver 14 and video amplifier 15 before being used as presently described.

The pulse-generating means 13 is periodically energized by a pulse 16 (FIGURE 2) developed periodically in the clock astable free-running multivibrator 17 which has an output signal applied also to the monostable multivibrator 18 for initiating its operation at substantially the same time as the operation of generating means is initiated by the same multivibrator 17. This operation of the multivibrator 18 results in development of a so-called delayed synch pulse 19 in its output circuit, the pulse 19 being delayed as indicated in FIGURE 2 so as to appear later in time than the pulse developed in the generating means 13 and indicated also in FIGURE 2 as the "main bang" or M.B. pulse 20. The amount of such delay may be adjusted by conventional means in the multivibrator 18 as represented by the adjustable resistance 21.

The delay synch pulse 19 is applied to the pull-down (P.D.) stage 22A of bistable multivibrator 22 to initiate its operation. The duration of the pulse developed in multivibrator 22 is within the expectant time of arrival of returning echo signals from test piece 10 and such pulse is applied to the coincidence stage 23 to which is also applied the amplified video signals from video amplifier 15.

When the first video signal appears contemporaneously during the time of the time-elongated pulse developed in multivibrator 22, a signal, referred to as a video synch signal, is developed in stage 23, one of such signals being applied to the bistable multivibrator 24 to initiate its operation and develop a reset signal therein which is applied to the pull-down stage 22A to discontinue operation of multivibrator stage 22. This reset signal developed in the output circuit of multivibrator 24 is developed by that video signal representative of the first reflection from the front face of test piece 10.

Also, in one form of the invention a video synch signal 26, developed in coincidence stage 23, is applied to two different channels, designated channel 1 and channel 2, for producing voltage gates delayed in different amounts in these two channels but overlapping in time as represented in FIGURE 3 wherein the time interval between $T_0$ and $T_2$ corresponds to the duration of the gate developed in channel 2 and the time interval between $T_1$ and $T_3$ represents the duration of the gate developed in channel 1. The time $T_F$ corresponds to the time at which the first reflection signal 28 from the front face of test piece 10 occurs; and the time $T_B$ corresponds to the time at which the reflection signal 29 from the back face of test piece 10 occurs. The time interval between $T_F$ and $T_B$ is thus representative of the thickness of the test piece.

For these purposes the video synch pulses 26 are applied to phantastron gate generators 31 and 32 in channels 1 and 2 respectively (when switch 9 is closed) to contemporaneously initiate a gate therein upon occurrance of reflection signal 28 or very shortly thereafter at time $T_0$. The gate 34 developed in phantastron terminates at time $T_2$ which is adjusted by conventional means as represented by adjustable resistance 32A and is applied to coincidence stage 36 to which is also applied the train of video signals from the output of video amplifier 15. When there is an inhomogeneity in the test piece 10 close to its front face, such video train includes the pulse 30 due to such inhomogeneity and results in the coincidence stage 36 developing a signal which is applied to the multivibrator stage 38 to initiate its operation and thereby develop in its output circuit the negative or negative going signal 40. This signal 40 is thus developed only when an inhomogeneity occurs in the test piece 10 corresponding to a region within the distance represented by the time interval $T_0-T_2$.

The video synch signal 26 applied to phantastron 31 having adjustable delay means 31A in channel 1 develops the elongated pulse 33 which is applied to and has its trailing edge differentiated in differentiator stage 35 to produce the negative pulse or spike 37 which is applied to the phantastron 39 having adjustable delay means 39A to develop the gate 41 occurring during the time interval $T_1-T_3$.

Such gate 41 is applied to the coincidence stage 43, to which is also applied the complete video train from video amplifier 19. When such video signal includes a signal 45 representative of an inhomogeneity or flaw near the back surface of the test piece, the coincidence stage 43 develops a signal which is applied to the multivibrator stage 47 to trigger the same and initiate the positive or positive going elongated pulse 49 in its output. It will be understood that such pulse 49 is developed only when a flaw occurs in the test piece in a region represented by the time interval $T_1-T_3$.

It is also seen that should an inhomogeneity occur in the region of the metal represented by the time interval $T_1-T_2$, a video signal 50 is produced and such video signal applied to both coincidence stages 36 and 43 results in initiation of the operation of both multivibrator stages 38 and 47 to produce corresponding negative and positive pulses 40 and 49 in their output circuits which are each coupled to the mixer stage 52.

The negative pulse 40, when it is developed, has one-half the amplitude of the positive pulse 49. Thus, the ouptut voltage of the mixer stage 52 is different, depending upon the location of the first flaw. When there are no inhomogeneities and the wall thickness of the metal is more than a certain standard amount, the output of mixer stage 52 is substantially a zero voltage or a voltage having no abrupt changes in its amplitude.

When an inhomogeneity occurs close to the front surface as represented by signal 30, the output voltage of mixer stage 52 is a negative voltage 40A; when the inhomogeneity occurs close to the back surface, the output voltage is a relatively large positive voltage 49A; when the inhomogeneity occurs in an intermediate position (between $T_1-T_2$), the two pulses 40 and 49 are effectively added to produce the relatively small positive pulse 40S which represents the algebraic sum of the amplitudes of positive pulse 49 and negative pulse 40. The positive pulse 49 has an amplitude twice that of the amplitude of negative pulse 40. It will also be observed that should the wall thickness fall below a certain minimum standard, the reflection 29 from the back surface falls within the time interval $T_1-T_3$ and that condition results in development of pulse 49 which is indicative of a flaw.

Suitable indicating and/or recording means 54 is connected to the mixer 52 for indicating and/or recording such pulses 40A, 49A, 40S or the absence of the same. Such indicating means may comprise an oscilloscope having such pulses applied to its cathode beam deflecting means for deflecting the beam in a vertical direction while being swept along a horizontal time base axis in synchronism with, for example, development of pulse 28. Also such indicating means may comprise a zero center voltmeter capable of indicating the amplitude of both positive and negative voltages; or the output of mixer stage 52 is applied to a deflectable recording element cooperating in conventional manner with its recording medium. In the latter case the recording medium may be moved in synchronism with movement of the crystal 12 as it moves relative to test piece 10. The recording medium records pulses in the general form of pulses 49A, 40A and 40S, preserving both their differences in amplitude and polarity. When the wall thickness is far below the minimum standard, then the corresponding pulse 49A is of corresponding longer duration than that produced by inhomogeneity 45 and thus the duration of recorded pulse 49A conveys information as to that condition. This is so because the multivibrator stage 47 is on for a longer period of time to develop a relatively long output signal 49A when the coincidence pulldown (P.D.) section 43 thereof is operated by a broad base back reflection pulse 29 than a smaller base signal 45 produced by an inhomogeneity in the material.

The system described is modified in another form of the present invention to produce similar indications and/or recordings when only one channel, namely channel 1, is used and the same is adjusted by adjustment of phantastrons 31 and 39 to produce the gate 63 which is initiated at time $T_{10}$ and terminates at time $T_{11}$ in the following manner. For this purpose channel 2 is made inoperative by opening switch 9 and the phantastrons 31 and 39 are adjusted by corresponding adjusting means represented by adjustable resistances 31A and 39A to establish gate 63 described in connection with FIGURE 4 wherein the pulses 61 and 62 are video signals derived respectively from the front and back surfaces of a test piece having a nominal thickness of one-quarter of an inch, i.e. the time interval $T_F-T_B$ between pulses 61 and 62 corresponds to one-quarter of an inch. The phantastrons 31 and 39 are adjusted to produce the gate represented at 63 having its leading edge 63A appearing at time $T_{10}$, i.e. shortly after pulse 61, and its trailing edge 63B appearing at time $T_{11}$, i.e. prior to time $T_B$, the time corresponding to nominal thickness. The time interval $T_{11}$–$T_B$ may, for example, be a time corresponding to one-quarter the nominal wall thickness, i.e. one-quarter of one-quarter inch or one-sixteenth of an inch ($\frac{1}{16}''$), a so-called tolerance. When the test piece 10 is of less thickness than its nominal thickness by an amount greater than one-sixteenth of an inch ($\frac{1}{16}''$), the pulse 62 then falls within the gate 63 as indicated in dotted lines in FIGURE 4, and the signals 49 and 49A are produced as previously described. These signals 49 and 49A are also produced should there be a flaw in the test piece represented by the video signal 64. Thus an indication and/or recording is accomplished either should the test piece have an inhomogeneity or discontinuity or should the wall thickness be less than a tolerable amount, i.e. in the case exemplified a thickness less than three-sixteenths inch ($\frac{3}{16}''$).

The apparatus is particularly useful when operating in conjunction with the apparatus described in the above-identified copending application which produces a recording, as illustrated at 70, of changes in wall thickness of the metal pipe, such recording 70 being made while the metal pipe is rotated about its axis relative to transducer 12 and while transducer 12 is simultaneously moved in a straight line in a direction parallel to such axis to thereby spirally scan the pipe. In the circumferential but spiral distance represented between 70A and 70B, the pipe is satisfactory, i.e. has a thickness greater than three-sixteenths inch ($\frac{3}{16}''$). But in the distance 70B to 70C, the thickness falls below three-sixteenths inch ($\frac{3}{16}''$) corresponding to the setting of the trailing edge 63B of gate 63. Thus under this condition pulse 49A is simultaneously recorded on the same recording medium.

In the distance between 70C and 70D, the thickness is again satisfactory and the output voltage of mixer 52 remains at its normal voltage level. At distance 70D an inhomogeneity in the metal develops a signal corresponding to recording 72 and the same being of sufficient intensity to produce an output in coincidence stage 43 results in pulse 49A which in this case illustrated is of shorter time duration than the previous pulse 49A. The presence of any pulse 49A thus serves as an indication or record of a flaw and the type of flaw may be distinguished in terms of the duration of pulse 49A.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an inspection system of the character described wherein it is desired to produce indications of an inhomogeneity in a material and or excessive thinness of the material, the combination comprising, a transducer couplable to said material for transmitting energy pulses to said material and for receiving resulting echo signals therefrom in the form of a train of video signals, the first of which corresponds to a reflection from the front surface of the material facing the transducer; pulse-generating means coupled to said transducer; a source of timing pulses coupled to said generating means for periodically operating said pulse-generating means; receiving means coupled to said transducer for amplifying said video signals; first means coupled to said source of timing pulses for initiating a first voltage wave in response to one of said timing pulses; a first coincidence stage coupled to both said first means and said receiving means and functioning to develop a first signal upon time coincidence of said first voltage wave and said first video signal; a first and a second channel each coupled to said coincidence stage and each being receptive to said first signal; said first channel incorporating second means for initiating a second voltage wave in response to said signal; said first channel incorporating a second coincidence stage coupled to both said second means and said receiving means and functioning to produce a second signal upon time coincidence of said second voltage wave and a video signal which succeeds in time said first video signal; said first channel incorporating third means for initiating a third voltage wave in response to said second signal; said second channel incorporating fourth means for initiating a fourth voltage wave in response to said first signal; said second channel incorporating a third coincidence stage coupled to both said fourth means and said receiving means and functioning to produce a third signal upon time coincidence of said fourth voltage wave and a video signal which succeeds in time said first viedo signal; fifth means coupled to said third coincidence stage for initiating a fifth voltage wave in response to said third signal; a mixer stage coupled to said third and fifth means and producing an output voltage representative of said third and fifth voltage waves; and indicating means coupled to said mixer stage and receptive to said output voltage for producing an indication in response to said output voltage, said first channel being separate from said second channel and incorporating delay means for delaying the initiation of said second voltage wave with respect to initiation of said fourth voltage wave.

2. A system as set forth in claim 1 in which said third and fifth voltage waves are of different polarities and of different amplitudes.

3. A system as set forth in claim 1 in which the fourth voltage wave produced by said fourth means is initiated at substantially the same time as said first signal and terminates at an appreciable time prior to an expectant echo signal from the back surface of the material, and said second means produces said second voltage wave which is initiated at a time appreciably after said first signal and which is terminated prior to an expectant echo from the back surface of the material.

4. A system as set forth in claim 1 in which said second and fourth voltage waves are gated voltages overlapping in time and which occur in that time interval between expectant echoes from the front and back surfaces of the material.

References Cited in the file of this patent

UNITED STATES PATENTS

| | | |
|---|---|---|
| 2,280,226 | Firestone | Apr. 21, 1942 |
| 2,507,854 | De Lano | May 16, 1950 |
| 2,740,289 | Van Valkenburg et al. | Apr. 3, 1956 |
| 2,883,860 | Henry | Apr. 28, 1959 |
| 3,009,353 | Erdman | Nov. 21, 1961 |
| 3,011,338 | Furon | Dec. 5, 1961 |
| 3,041,872 | Brown et al. | July 3, 1962 |
| 3,049,912 | Cronin | Aug. 21, 1962 |